United States Patent
Allouche et al.

(10) Patent No.: US 10,652,256 B2
(45) Date of Patent: May 12, 2020

(54) REAL-TIME ACTIVE THREAT VALIDATION MECHANISM FOR VEHICLE COMPUTER SYSTEMS

(71) Applicant: International Business Machines Corporation, Armonk, NY (US)

(72) Inventors: Yair Allouche, Dvira (IL); Arndt Kohler, Reutlingen (DE); Ravid Sagy, Beit Yizhack (IL); Yaron Wolfsthal, Biniamina (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 15/627,467

(22) Filed: Jun. 20, 2017

(65) Prior Publication Data

US 2018/0367554 A1 Dec. 20, 2018

(51) Int. Cl.
*H04L 29/06* (2006.01)
*H04L 29/00* (2006.01)
(Continued)

(52) U.S. Cl.
CPC ........ *H04L 63/1425* (2013.01); *G06F 16/951* (2019.01); *G06F 21/554* (2013.01);
(Continued)

(58) Field of Classification Search
CPC ............... H04L 63/1425; H04L 63/123; H04L 63/1433; H04L 63/1458; G06F 16/951; G06F 21/00
(Continued)

(56) References Cited

U.S. PATENT DOCUMENTS 6,163,250 A * 12/2000 Moskowitz ............. B60Q 1/52
116/28 R
6,181,996 B1 * 1/2001 Chou ..................... B60K 37/00
340/439
(Continued)

FOREIGN PATENT DOCUMENTS

RU        0002605651        12/2016

OTHER PUBLICATIONS

Koscher et al., "Experimental Security Analysis of a Modern Automobile", 2010 IEEE Symposium on Security and Privacy, May 2010, pp. 447-462.
(Continued)

*Primary Examiner* — Haresh N Patel
(74) *Attorney, Agent, or Firm* — Dvir Gassner

(57) ABSTRACT

A vehicle system, comprising multiple electronic control units (ECUs) configured to manage operation of multiple vehicle components, a controller area network (CAN) bus that provides communication pathways between the multiple ECUs, and a threat validation module configured to receive a message from an electronic control unit (ECU) of the multiple ECUs, wherein the message comprises data of a suspicious message flagged by the ECU, generate a query to determine authenticity of the message, broadcast the query to at least one ECU of the multiple ECUs, listen for responses from the at least one ECU, and determine whether the suspicious message is an actual threat based at least on a count of received responses.

15 Claims, 3 Drawing Sheets

(51) Int. Cl.
- *G06F 16/951* (2019.01)
- *G06F 21/85* (2013.01)
- *G06F 21/55* (2013.01)
- *H04W 4/48* (2018.01)
- *H04W 12/12* (2009.01)

(52) U.S. Cl.
CPC ............ *G06F 21/85* (2013.01); *H04L 63/123* (2013.01); *H04L 63/1433* (2013.01); *H04L 63/1441* (2013.01); *H04L 63/1458* (2013.01); *H04W 4/48* (2018.02); *H04W 12/12* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 6,339,736 | B1 * | 1/2002 | Moskowitz | G06Q 10/087 701/32.7 |
| 8,768,681 | B2 * | 7/2014 | Kajitani | G05B 17/02 703/23 |
| 2002/0073243 | A1 * | 6/2002 | Staiger | H04L 49/90 719/313 |
| 2002/0163426 | A1 * | 11/2002 | Moskowitz | B60R 25/1004 340/426.1 |
| 2009/0306952 | A1 * | 12/2009 | Kajitani | G06F 17/5022 703/13 |
| 2010/0305926 | A1 * | 12/2010 | Canedo | G06F 17/5009 703/8 |
| 2011/0015916 | A1 * | 1/2011 | Kataoka | G06F 17/5009 703/19 |
| 2012/0029893 | A1 * | 2/2012 | Komatsu | G05B 17/02 703/8 |
| 2013/0212659 | A1 | 8/2013 | Maher et al. | |
| 2014/0150064 | A1 * | 5/2014 | Wifvesson | H04L 63/08 726/3 |
| 2015/0150124 | A1 | 5/2015 | Zhang et al. | |
| 2015/0195297 | A1 | 7/2015 | Ben Noon et al. | |
| 2015/0270968 | A1 * | 9/2015 | Nairn | H04L 9/32 713/181 |
| 2017/0126711 | A1 * | 5/2017 | Jung | G05B 15/02 703/8 |
| 2018/0013788 | A1 * | 1/2018 | Vissamsetty | H04L 63/1466 703/8 |
| 2018/0069874 | A1 * | 3/2018 | Saeki | B60R 16/023 703/8 |
| 2018/0241584 | A1 * | 8/2018 | Ruvio | H04L 12/40013 703/8 |
| 2018/0322711 | A1 * | 11/2018 | Weimerskirch | G06N 20/00 703/8 |

OTHER PUBLICATIONS

Wolf et al., "Secure In-Vehicle Communication", Embedded Security in Cars, 2006, pp. 95-109, Springer-Verlag Berlin Heidelberg.

* cited by examiner

REAL-TIME ACTIVE THREAT VALIDATION MECHANISM FOR VEHICLE COMPUTER SYSTEMS

BACKGROUND

The invention relates to the field of vehicle security.

New vehicle technologies facilitate many valuable capabilities such as improved driver safety, vehicle performance and passenger comfort. Modern vehicles are essentially large and complex computer systems: The vehicles are controlled and monitored by multiple Electronic Control Units (ECUs) that coordinate operation by communicating over one or more internal network buses, e.g. Central Access Network (CAN) buses. In addition, modern vehicles are further connected through a plurality of external network interfaces, e.g., RFID, Bluetooth, Dedicated Short Range Communication (DSRC), WiFi, Cellular, and/or the like, to external third parties. This connectivity, on the one hand, facilitates a variety of services including telematics, navigation, safety and the like, which provide significant benefits for automakers, aftermarket vendors, fleet managers, drives, and passengers. However, these capabilities also introduce new security and privacy concerns.

Several mechanisms for improving vehicle security include integrating cryptographic primitives such as authentication and encryption, segregating the vehicle's internal network using security gateways, using firewalls to protect the internal network from the outside world, and/or the like. Most methods for securing vehicles are only passive, e.g. such as listening to the CAN bus with the purpose of detecting threats by identifying suspicious behaviors. The accuracy of threat detection is crucial, as faulty detections of non-threats as well as failures to detect actual threats may have severe consequences, such as theft, accidents, etc.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment a vehicle system, comprising multiple electronic control units (ECUs) configured to manage operation of multiple vehicle components; a controller area network (CAN) bus that provides communication pathways between the multiple ECUs; and a threat validation module configured to: receive a message from an electronic control unit (ECU) of the multiple ECUs, wherein the message comprises data of a suspicious message flagged by the ECU, generate a query to determine authenticity of the message, broadcast the query to at least one ECU of the multiple ECUs, listen for responses from the at least one ECU, and determine whether the suspicious message is an actual threat based at least on a count of received responses.

In certain embodiments, the threat validation module is further configured to detect whether a jamming of the CAN bus is ongoing, and wherein the determination of whether the suspicious message is an actual threat is further based on the detection.

In certain embodiments, the response to the query is a binary response.

In certain embodiments, the query comprises an identification to identify the at least one ECU that generates messages similar to the suspicious message.

In certain embodiments, the at least one ECU must respond to the query.

In certain embodiments, the threat validation module is further configured to provide an indication that the suspicious message is a threat.

In certain embodiments, the query is provided to the at least one ECU according to a communication protocol.

In certain embodiments, the vehicle system further comprises a hardware processor wherein, the threat validation module is a software module executed by said hardware processor.

There is provided, in accordance with an embodiment a method comprising using at least one hardware processor of a vehicle system for: receiving a message comprising data of a suspicious message that was flagged as suspicious by an electronic control unit (ECU); generating a query to determine authenticity of the suspicious message; broadcasting the query via a controller area network (CAN) bus to at least one ECU coupled to the CAN bus; listening for responses from the at least one ECUs; and determining whether the suspicious message is an actual threat based at least on a count of received responses.

In certain embodiments, the method further comprising detecting whether a jamming of the CAN bus is ongoing, and wherein the determination of whether the suspicious message is an actual threat is further based on the detection.

In certain embodiments, the method further comprising providing an indication that the suspicious message is likely a threat.

In certain embodiments, the suspicious message is determined not to be an actual threat when the bus is not jammed and the count of at least on the count of received responses.

In certain embodiments, determination that the suspicious message is an actual threat according to at least a response value of the responses received.

In certain embodiments, the method further comprising detecting an actual threat when the responses received do not match the expected responses.

In certain embodiments, the query is provided to the at least one ECU according to a communication protocol.

There is provided, in accordance with an embodiment a computer program product for vehicular test generation, the computer program product comprising a non-transitory computer-readable storage medium having program code embodied therewith, the program code executable by at least one hardware processor to: receiving a message comprising data of a suspicious message that was flagged as suspicious by an electronic control unit (ECU); generate a query to determine authenticity of the suspicious message; broadcast the query on a central access network (CAN) bus to at least one ECU; listen for responses from the at least one ECU; and determine whether the suspicious message is an actual threat based at least on a count of received responses.

In certain embodiments, the program code is further executable by the at least one hardware processor to detect whether a jamming of the CAN bus is ongoing.

In certain embodiments, the suspicious message is an actual threat is further based on the detection.

In certain embodiments, the program code is further executable by the at least one hardware processor to provide an indication that the suspicious message is likely a threat.

In certain embodiments, the program code is further executable by the at least one hardware processor to determine the suspicious message is not an actual threat when the bus is not jammed and the count of at least on the count of received responses.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

The subject matter described herein relates to vehicle real-time threat validation According to certain embodiments, once a vehicle's existing security module suspects that a message or a set of messages may have been initiated by an intruder and not by a vehicle device (e.g. by an electronic control unit (ECU)), the message may be flagged as a suspicious message. Optionally, the vehicle device generates a message comprising data of the suspicious message, and identification data necessary for identifying a sending ECU. Optionally, the message comprising the suspicious message and the identification data is broadcast on a Central Access Network (CAN) bus. Optionally, the vehicle device generates the new message comprising the suspicious message and identification data through direct communication, e.g. not via broadcasting on the CAN bus. A threat validation module may receive that broadcast, generate a suitable query, and broadcast that query on the CAN bus. After broadcasting the query, the threat validation module may listen for responses from the connected devices, e.g. ECUs. In some cases, the responses received might not match expected responses, e.g. either a number of responses or a value of the responses might not match the expected responses. The threat validation module may know the number of expected responses according to predetermined communications on the CAN bus, e.g. specific ECUs may broadcast specific messages and commands on the CAN bus. In such a case, the threat validation module may determine that the suspicious message is an actual threat.

In some cases, the threat validation module may detect an ongoing jam of the CAN bus. To prevent detection of the threat, the third party attacking the vehicle system may attempt to jam the CAN bus with messages causing congestion thus preventing the responses of the ECUs to the query from being received by the threat validation module. In certain embodiments, the jam may occur by messages broadcasting on the CAN bus that have a higher priority than the responses from the ECUs. The congestion may result in a time-lapse in which the threat validation module may not receive the responses, and determines a jamming is ongoing.

Upon rendering the determination, the threat validation module may provide an indication to the ECU that the suspicious message is a threat. The indication enables the ECU to make a more accurate assessment whether the message flagged as suspicious is an attack or not and reduce the number of faulty detections of threats, e.g. reducing a false positive rate.

Figure 1A:
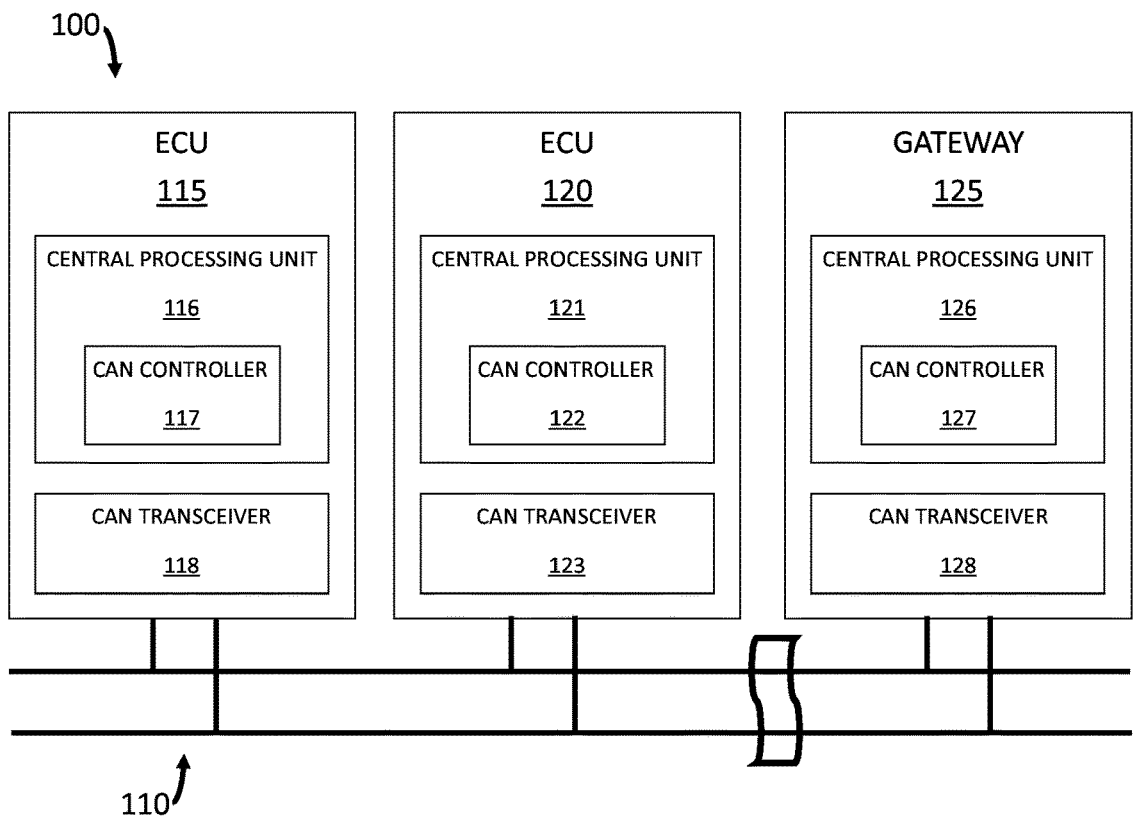
FIG. 1A-1B show vehicle systems, according to some exemplary embodiments of the subject matter.
Figure 1B:
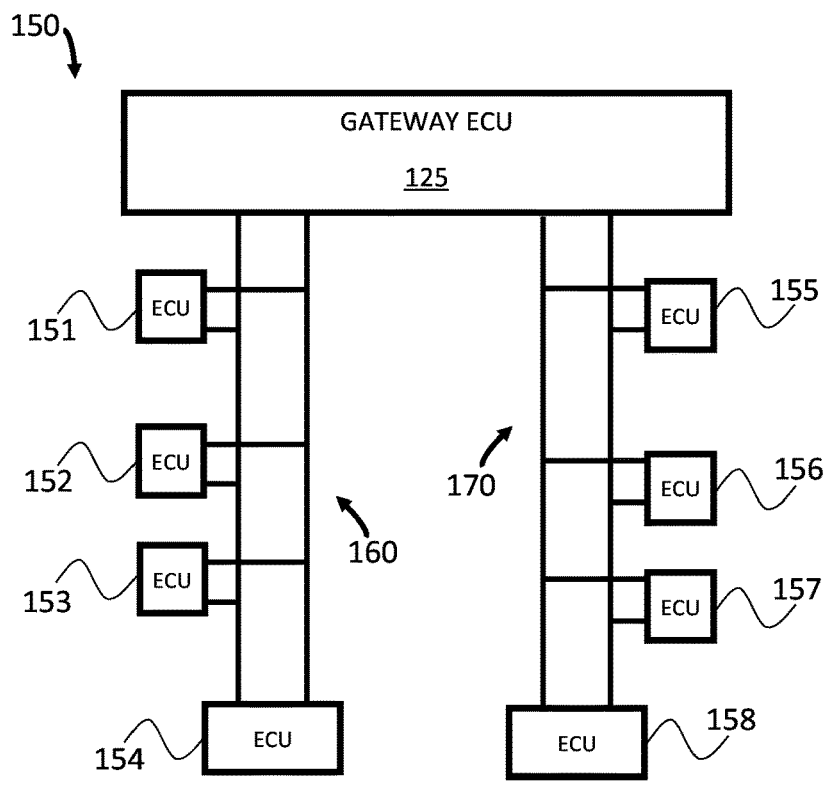

FIG. 1A-1B show vehicle systems, according to some exemplary embodiments of the subject matter. FIG. 1A shows a certain exemplary embodiment of a vehicle system 100. Vehicle system 100 may comprise a Central Access Network bus (CAN bus) 110, which may be configured to connect multiple electronic control units (ECU's), for example, electronic control unit (ECU) 115, ECU 120, and gateway ECU 125. Optionally, CAN bus 110 enables multiple ECUs 112 to communicate by sending and receiving messages, via CAN bus 110. In certain embodiments, gateway ECU 125 enables communication with a standard computer, for example, via an ethernet port or universal serial bus (USB).

Optionally, messages broadcasted on CAN bus 110 comprise a start-of-frame, an identifier, a remote transmission request, a data length code, a data field, a cyclic redundancy check (CRC) field, acknowledgment (ACK) slot, and an end-of-frame (EOF), and/or the like. The identifier may provide an identification of the intended recipient ECU, a priority of the message and a sender of the message. Messages may comprise "dominant" bits and "recessive" bits where a dominant bit may be a logical 0 (e.g. actively driven to a voltage by the transmitter) and a recessive bit may be a logical 1 (e.g. passively returned to a voltage by a resistor). Optionally, messages with identifier of logical 0 have priority over messages with identifier of logical 1. When an excessive number of messages are being broadcasted on CAN bus 110 may result in jamming of CAN bus 110 due to congestion. During jamming, messages with low priority, e.g. having a logical 1, may not get broadcasted and may not reach an intended recipient.

In certain embodiments, each of multiple ECUs 112, may comprise a central processing unit, e.g. central processing unit 116, 121, 126. Each of central processing units 116, 121, 126 may be, for example, a microcontroller (mC) or a digital signal processor (DSP). Each of central processing units 116, 121, 126 may be configured as a host processor to decide if a message broadcasted on the CAN bus 110 may to be received and what messages to transmit. Optionally, each of multiple ECUs 112 may comprise a CAN controller, e.g. CAN controller 117, CAN controller 122, and CAN controller 127, which is configured to store received serial bits from CAN bus 110 until an entire message is received. Optionally, CAN controller is configured to transmit messages received from central processing unit onto CAN bus 110, for example transmitting the serial bits of the message onto CAN bus 110. Each of multiple ECUs 112 may comprise a CAN transceiver, e.g. CAN transceivers 118, 123, 128, which may be configured to convert data streamed from CAN bus 110 to a CAN controller level and vice-versa. Each of multiple ECUs 112 may be configured to operate and manage vehicle components, e.g. sensors, actuators, control devices, and/or the like, according to messages broadcasted on CAN bus 110.

Figures 2A, 2B:
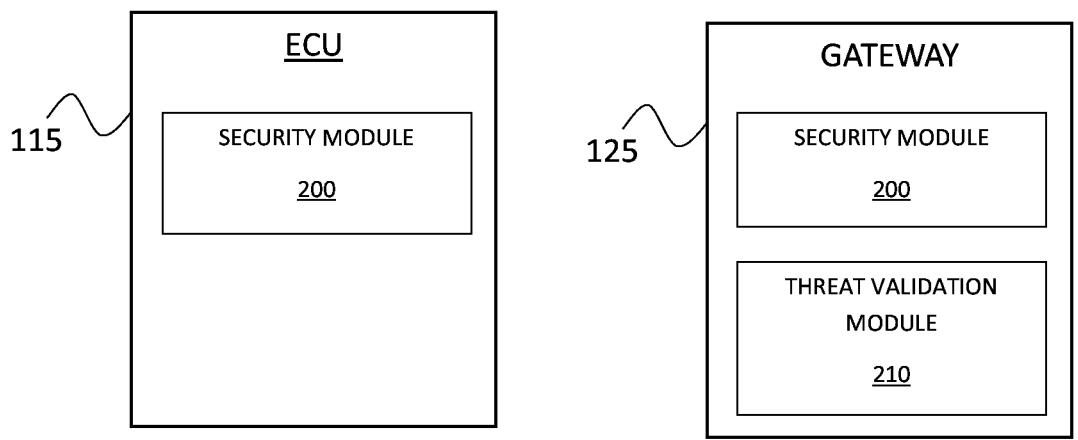
FIG. 2A-2B show electronic control units configured to provide vehicle security, according to some exemplary embodiments of the subject matter.

In certain embodiments, each of central processing units 116, 121, 126 may comprise a security module 200 as shown in FIG. 2A-2B, which enables detecting messages received that may be an attempt of a third party to interfere with the functions of the ECU, for example a hacking of the ECU. The security module may flag the message as a suspicious message and may send the suspicious message to a threat validation module 210 of FIG. 2B for further validation to ensure that the flagging does not result in a false positive. Central processing unit 126 may comprise threat validation module 210 as shown in FIG. 2B.

FIG. 1B shows a vehicle system 150 comprising multiple CAN buses connecting multiple ECUs, according to certain embodiments. Vehicle system 150 may comprise CAN buses 160, 170. CAN buses 160, 170 may be coupled to gateway ECU 125 such that gateway ECU 125 receives and broadcasts to all CAN buses of vehicle system 150. Each CAN bus of vehicle system 150 may be coupled to various ECUs that perform different tasks in vehicle system 150. Optionally, the multiple ECUs may comprise ECU 151, 152, 153, 154, 155, 156, 157, 158. For example, CAN bus 160 may connect ECUs 151, 152, 153, 154, along with gateway ECU 125, and CAN bus 170 may connect ECUs 155, 156, 157, 158 and gateway ECU 125. Optionally, gateway ECU 125 provides the threat assessment required because all CAN bus communication is received by gateway ECU 125. It is noted that gateway ECU 125 may be replaced by any other ECU of vehicle system 150 that may listen and broadcast on all CAN buses of vehicle system 150.

Referring to FIG. 2A-2B showing electronic control units configured to provide vehicle security, according certain embodiments. FIG. 2A shows an ECU, e.g. ECU 115, which may be configured to operate a security module 200 for detecting a threat. It is noted that ECU 115 is used for exemplary purposes and may also describe ECU 120, 151, 152, 153, 154, 155, 156, 157, and 158 of FIGS. 1A-B. The threat may be a message received by ECU 115, which security module 200 may flag as a suspicious message. Upon flagging the suspicious message, the ECU 115 may transfer the message to a threat assessment module 210. Optionally, threat assessment module 210 is operated by gateway ECU 125 or some other ECU in the vehicle system 100 or 150.

Referring to FIG. 2B, showing the gateway ECU 125. Gateway ECU 125 may be configured to validate an actual threat, according to certain embodiments. Optionally, any ECU of vehicle system 100 or vehicle system 150 is configured to operate threat validation module 210. Threat validation module 210 may receive a suspicious message from ECU 115. Optionally, upon flagging the suspicious message, the vehicle device generates a message comprising data of the suspicious message, and identification data necessary for identifying a sending ECU. Optionally, the message comprising the suspicious message and the identification data is broadcast on a Central Access Network (CAN) bus. Optionally, the vehicle device generates the new message comprising the suspicious message and identification data through direct communication, e.g. not via broadcasting on the CAN bus.

The threat validation module 210 may generate a query to determine whether the suspicious message was sent by ECUs that generate messages similar or identical to the data of the suspicious message. For example, a message to activate brakes may be sent by an integrated brake system (IBS) ECU and electronic stability control (ESP) ECU, threat validation module 210 may generate a query to the IBS ECU and the ESP ECU to determine if one of the ECUs sent the suspicious message. The query may be broadcasted on CAN bus 110 to the IBS ECU and the ESP ECU. The threat validation module 210 may listen for responses from the recipients of the query. The threat validation module 210 may receive responses from the intended ECUs and compares the responses to expected responses to determine whether the suspicious message is indicative of being a threat.

Threat validation module 210 may determine the suspicious message is indicative of an actual threat by detecting a jamming of CAN bus 110. In certain embodiments, to prevent the responses to the query from arriving at threat validation module 210, a third party may attempt to flood CAN bus 110 with messages having a higher priority than the responses. The messages broadcasted may cause congestion on CAN bus 110 and may prevent threat validation module 210 from receiving the responses. Threat validation module 210 may determine the jamming is ongoing when the responses are not received within a predetermined time window. For example, the responses are not received within a time window within a range of 0.10-0.50 milliseconds. Upon determining that CAN bus 110 is jammed, threat validation module 210 may provide an indication that the suspicious message is likely to be a threat. Optionally, the detection of an ongoing jam is performed prior to receiving the responses to the query. In certain embodiments, the responses may not be received due to the ongoing jam, as such the threat validation module 210 determines that the threat is ongoing without evaluating the responses.

For example, when the suspicious message relates to a command to ECU controlling the brake, threat validation module 210 broadcasts the query on the CAN bus 110 to the IBS ECU and the ESP ECU to authenticate whether one of the ECUs sent the message that was flagged as suspicious. The threat validation module 210 may wait a predetermined time, e.g. a predetermined time of 10 milliseconds, for responses from the IBS ECU and the ESP ECU. When no response is received in that time, the threat validation module 210 may determine that the CAN bus is jammed. In accordance with the determination, the threat validation module 210 may provide an indication, e.g. a message, to an ECU that controls activation of the brakes, that it is more likely that the suspicious message is a threat.

Figure 3:
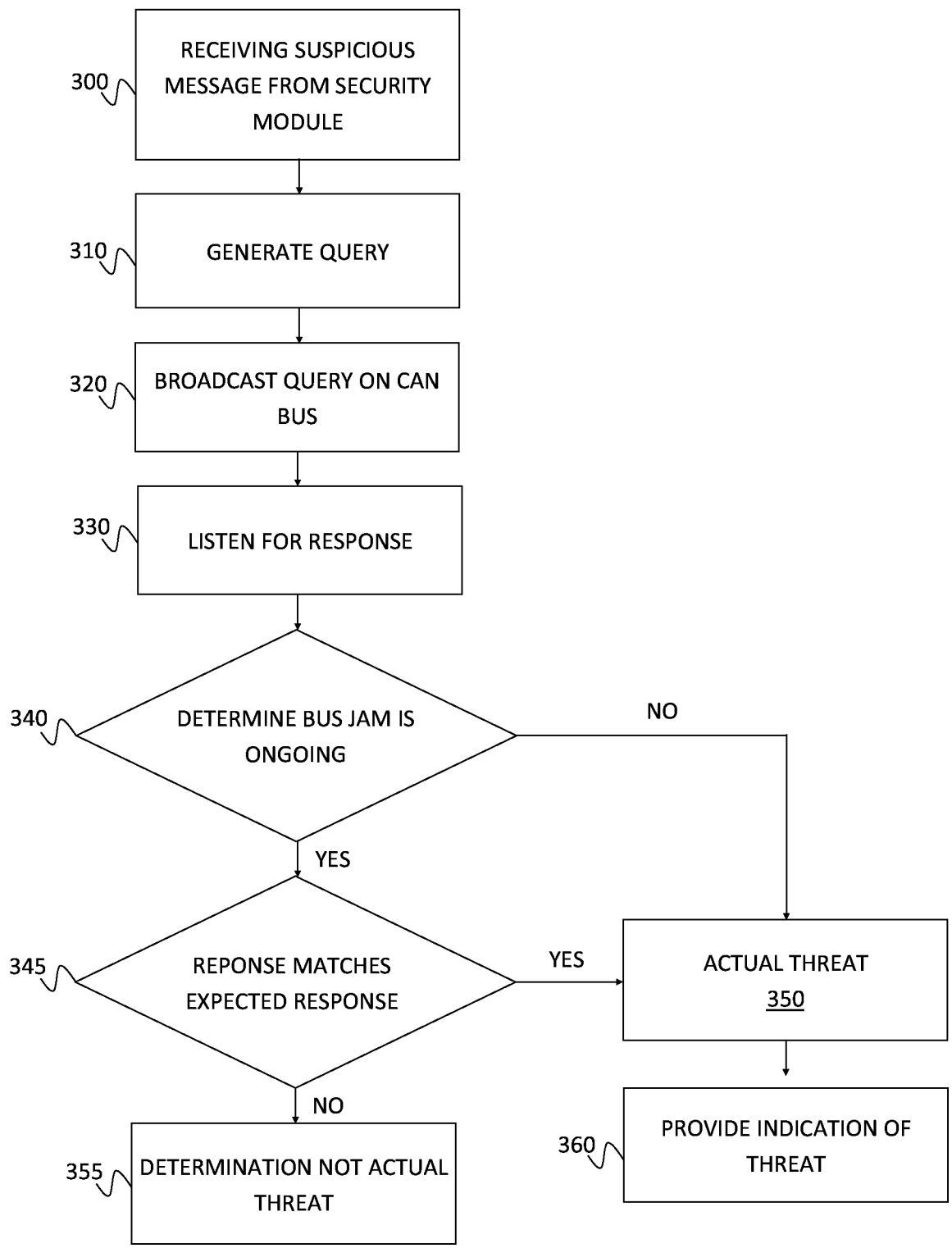
FIG. 3 shows a flowchart illustrating a method to determine a threat, according to some exemplary embodiments of the subject matter.

FIG. 3 shows a flowchart illustrating a method to determine a threat, according to some exemplary embodiments of the subject matter. Step 300 discloses receiving a suspicious message. Threat validation module 210 receives the suspicious message via CAN bus 110 from at least one ECU. The suspicious message may comprise an identifier to identify the at least one ECU that sent the suspicious message to threat validation module 210 and a priority of the message. Optionally, the priority of the suspicious message is high to ensure that the suspicious message is received by threat validation module 210.

Step 310 discloses generating a query. The threat validation module 210 may generate the query, which may request a response from ECUs that may send messages similar to the suspicious message. Optionally, the query comprises identifiers that recognize the ECUs that must respond to the query. Optionally, the query identifier comprises a high priority to ensure the query is broadcasted and received by the ECUs. For example, where the suspicious message is related to braking or brakes, the relevant ECUs may be the IBS ECU and the ESP ECU. The query may request the relevant ECUs provide confirmation that the suspicious message was transmitted by one of the relevant ECUs.

Step 320 discloses broadcasting the query on CAN bus 110. The threat validation module 210 may broadcast the query. Optionally, according to the identifier of the query an ECU knows to respond or ignore the query. In certain embodiments, at least one ECU may receive the query and may broadcast a response to the query.

Step 330 discloses listening for responses. Threat validation module 210 may listen for responses to the query provided by at least one ECU of the vehicle system, e.g. vehicle system 100 or 150, that is required to respond. Optionally, the response to the query may notify threat validation module 210 whether the at least one ECU broadcasted the suspicious message. For example, the response may be a binary response, e.g. a "0" for a response that no message was broadcasted from the at least one ECU, and a "1" for a response that the suspicious message was broadcasted by the at least one ECU.

Step 340 discloses determining whether a jamming is ongoing. In certain embodiments, to prevent the responses to the query to arrive at threat validation module 210, the third party may flood CAN bus 110 with messages having a higher priority than the responses. The messages broadcasted by the third-party cause congestion on CAN bus 110 and prevents threat validation module 210 from receiving responses and determining the legitimacy of the suspicious message. Threat validation module 210 may determine the jamming is occurring when the responses are not received within a predetermined time window, for example, a time window within a range of 0.10-0.50 milliseconds.

Step 345 discloses determining whether the suspicious message is an actual threat according to at least a count of received responses. Optionally, the determination is according to a count of a value of the responses. For example, when threat validation module 210 expects responses from IBS ECU and ESP ECU, e.g. two responses, as well as at least one of the responses to have a binary value of "1" to notify that one of the two ECUs sent the suspicious message. Threat validation module 210 may receive two responses from IBS ECU and ESP ECU. An expected response would be that either one or both IBS ECU and ESP ECU provide a binary "1" response to indicate sending the response depending on the command in the original message. Where the responses match the expected responses, e.g. one or two positive responses indicating that either or both IBS ECU and ESP ECU provide a response of "1", threat validation module 210 may determine that it is less likely that the suspicious message is not a threat. Where IBS ECU and ESP ECU provide a response with a "0", e.g. that the suspicious message was not sent by either ECU, threat validation module 210 may determine that it is more likely that the suspicious message is a threat.

Step 350 discloses determining the suspicious message is an actual threat. Optionally, where threat validation module 210 receives responses to the query that are not expected or there is an ongoing jamming, the threat validation module 210 determines an actual threat is ongoing.

Step 355 discloses determining the suspicious message is not an actual threat. Optionally, where the response to the query matches the expected responses and no jamming is ongoing, the threat validation module 210 determines the message is not suspicious and operate in accordance with the content of the message.

Step 360 discloses providing an indication that the suspicious message is a threat. The threat validation module 210 may provide an indication to the ECU that broadcasted the suspicious message to threat validation module 210. The indication may increase the likelihood of the ECU determining the suspicious message is likely a threat, e.g. an attack.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A vehicle system, comprising:
   multiple electronic control units (ECUs) configured to manage operation of multiple vehicle components, wherein each of the ECUs comprises a security module configured to: (a) flag a suspicious message received by the ECU, the suspicious message being suspected to be an attempt to interfere with functions of the ECU, and (b) transmit a message that comprises data of the suspicious message;
   a controller area network (CAN) bus that provides communication pathways between the multiple ECUs; and
   a threat validation module configured to:
   receive, from an ECU of the multiple ECUs, the message that comprises the data of the suspicious message flagged by the respective ECU,
   generate a query to determine authenticity of the suspicious message, wherein the query is directed only to one or more relevant ECUs of the multiple ECUs, wherein the one or more relevant ECUs are ones which typically generate messages that are similar or identical to the data of the suspicious message, and wherein the query requires each of the one or more relevant ECUs to respond by indicating if it is the one which transmitted the suspicious message,
   broadcast the query to the one or more relevant ECUs,
   listen, for a predetermined period of time, for responses to the query from the one or more relevant ECUs, and
   determine that the suspicious message is an actual threat if one of the following holds true: (a) the one or more relevant ECUs responded, within the predetermined period of time, that they did not transmit the suspicious message, and (b) the threat detection module determines that CAN bus jamming is ongoing because no response has been received from the one or more relevant ECUs within the predetermined period of time.

2. The vehicle system of claim 1, wherein the response to the query is a binary response.

3. The vehicle system of claim 1, wherein one or more relevant ECUs must respond to the query.

4. The vehicle system of claim 1, further comprising a hardware processor, wherein the threat validation module is a software module executed by said hardware processor.

5. The vehicle system of claim 1, wherein the query comprises a high-priority identifier, to ensure the query is broadcasted over the CAN bus and received by the one or more relevant ECUs.

6. The vehicle system of claim 1, wherein the message that comprises the data of the suspicious message is transmitted to the threat validation module with a high-priority setting, to ensure receipt by the threat validation module.

7. The vehicle system of claim 1, wherein the predetermined period of time is within the range of 0.1 to 10 milliseconds.

8. A method comprising using at least one hardware processor of a vehicle system for:
   receiving a message comprising data of a suspicious message that was flagged as suspicious by an electronic control unit (ECU) of multiple ECUs of the vehicle system, wherein each of the ECUs comprises a security module configured to: (a) flag a suspicious message received by the ECU, the suspicious message being suspected to be an attempt to interfere with functions of the ECU, and (b) transmit a message that comprises data of the suspicious message;

generating a query to determine authenticity of the suspicious message, wherein the query is directed only to one or more relevant ECUs of the multiple ECUs, wherein the one or more relevant ECUs are ones which typically generate messages that are similar or identical to the data of the suspicious message, and wherein the query requires each of the one or more relevant ECUs to respond by indicating if it is the one which transmitted the suspicious message;

broadcasting the query via a controller area network (CAN) bus to the one or more relevant ECUs;

listening, for a predetermined period of time, for responses to the query from the one or more relevant ECUs; and determining that the suspicious message is an actual threat if one of the following holds true: (a) the one or more relevant ECUs responded, within the predetermined period of time, that they did not transmit the suspicious message, and (b) the threat detection module determines that CAN bus jamming is ongoing because no response has been received from the one or more relevant ECUs within the predetermined period of time.

9. The method of claim 8, wherein the query comprises a high-priority identifier, to ensure the query is broadcasted over the CAN bus and received by the one or more relevant ECUs.

10. The method of claim 8, wherein the message that comprises the data of the suspicious message is transmitted to the threat validation module with a high-priority setting, to ensure receipt by the threat validation module.

11. The method of claim 8, wherein the predetermined period of time is within the range of 0.1 to 10 milliseconds.

12. A computer program product comprising a non-transitory computer-readable storage medium having program code embodied therewith, the program code executable by at least one hardware processor to:

receive a message comprising data of a suspicious message that was flagged as suspicious by an electronic control unit (ECU) of multiple ECUs of a vehicle system, wherein each of the ECUs comprises a security module configured to: (a) flag a suspicious message received by the ECU, the suspicious message being suspected to be an attempt to interfere with functions of the ECU, and (b) transmit a message that comprises data of the suspicious message;

generate a query to determine authenticity of the suspicious message, wherein the query is directed only to one or more relevant ECUs of the multiple ECUs, wherein the one or more relevant ECUs are ones which typically generate messages that are similar or identical to the data of the suspicious message, and wherein the query requires each of the one or more relevant ECUs to respond by indicating if it is the one which transmitted the suspicious message;

broadcast the query via a central access network (CAN) bus to the one or more relevant ECUs;

listen, for a predetermined period of time, for responses to the query from the one or more relevant ECUs; and determine that the suspicious message is an actual threat if one of the following holds true: (a) the one or more relevant ECUs responded, within the predetermined period of time, that they did not transmit the suspicious message, and (b) the threat detection module determines that CAN bus jamming is ongoing because no response has been received from the one or more relevant ECUs within the predetermined period of time.

13. The computer program product of claim 12, wherein the query comprises a high-priority identifier, to ensure the query is broadcasted over the CAN bus and received by the one or more relevant ECUs.

14. The computer program product of claim 12, wherein the message that comprises the data of the suspicious message is transmitted to the threat validation module with a high-priority setting, to ensure receipt by the threat validation module.

15. The computer program product of claim 12, wherein the predetermined period of time is within the range of 0.1 to 10 milliseconds.

* * * * *